Feb. 28, 1956 G. D. McKENZIE 2,736,151
PNEUMATIC COTTON HARVESTER
Filed Sept. 16, 1953 2 Sheets-Sheet 1
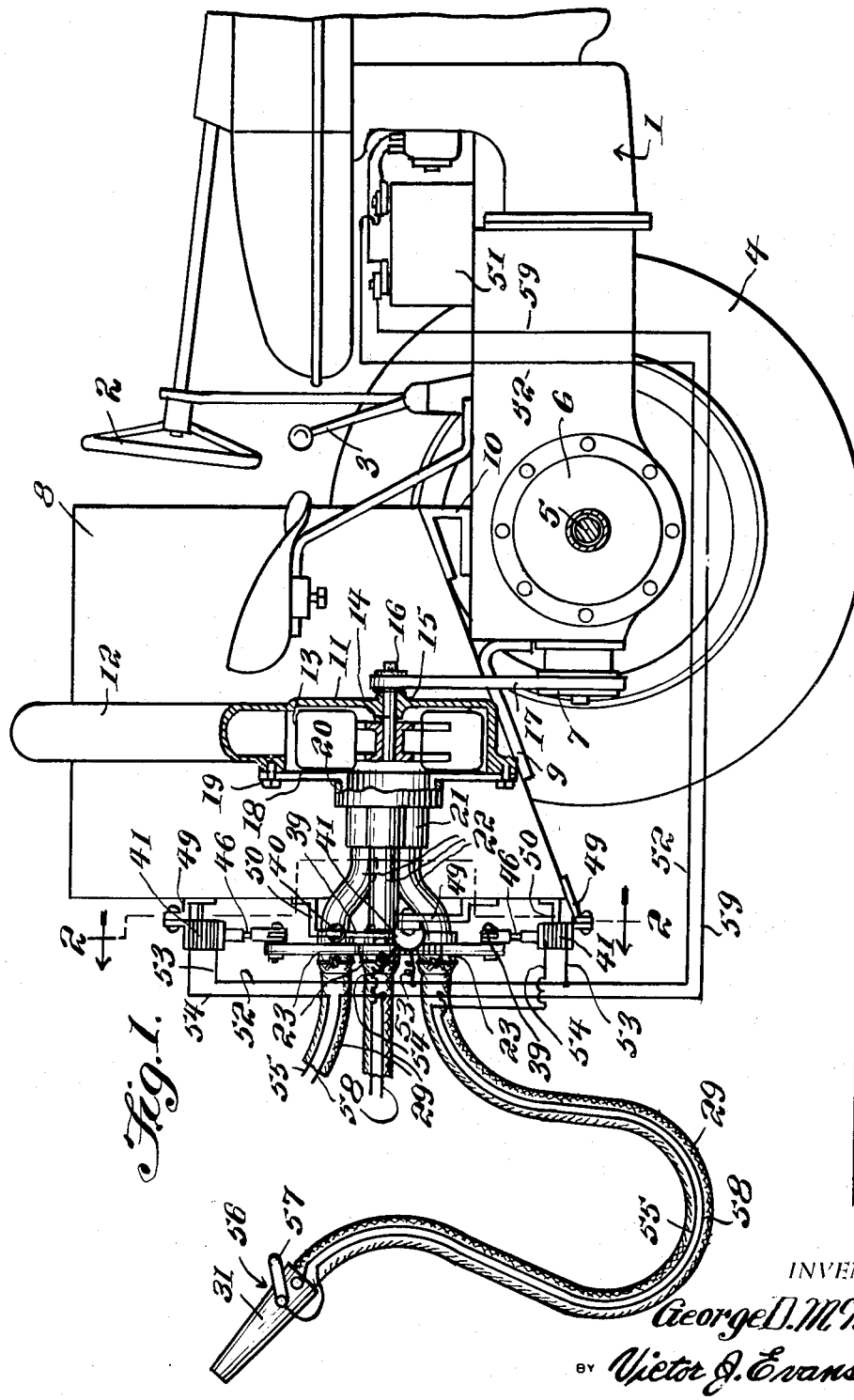
INVENTOR.
George D. McKenzie,
BY Victor J. Evans & Co.
ATTORNEYS

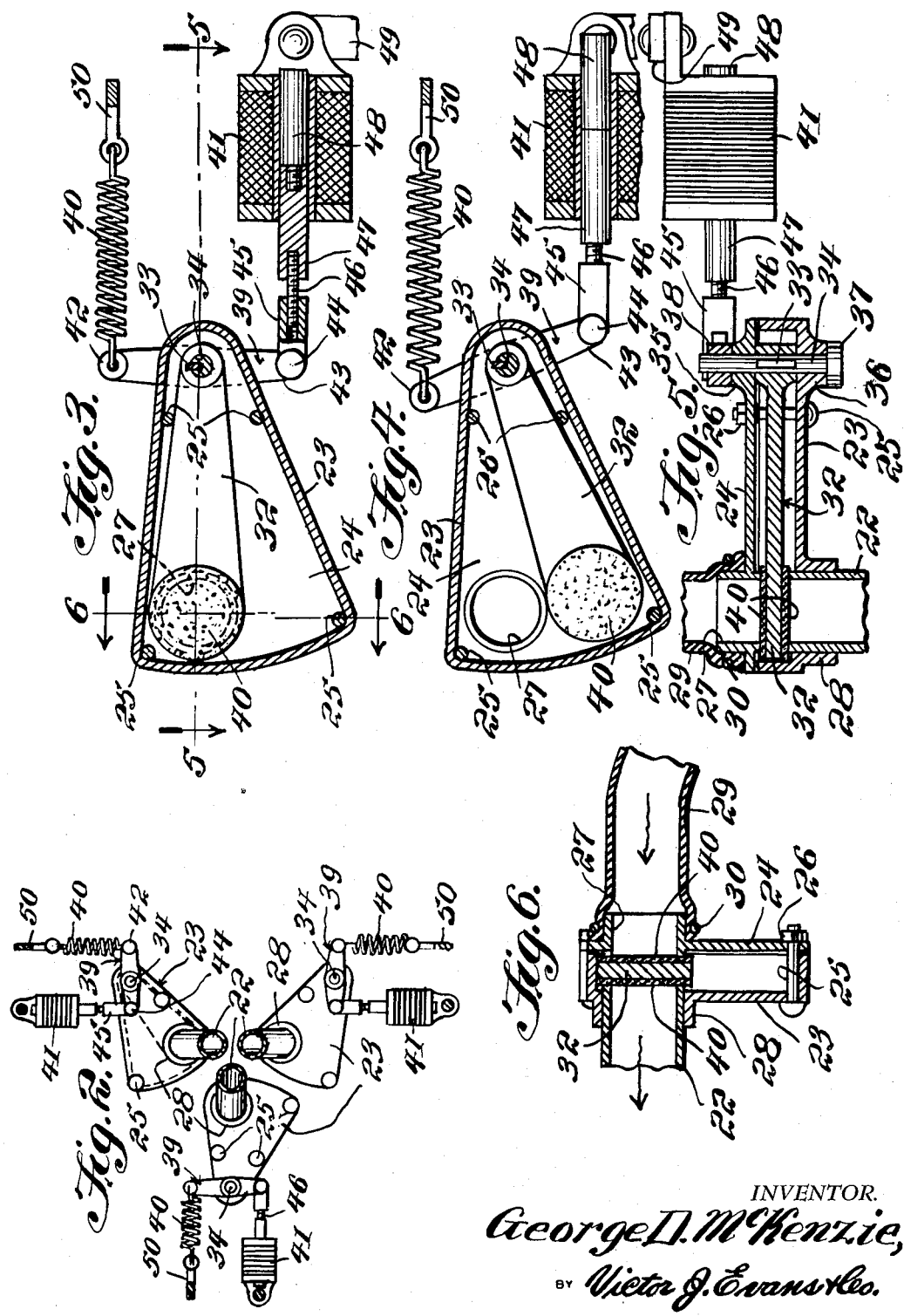

United States Patent Office 2,736,151
Patented Feb. 28, 1956

2,736,151

PNEUMATIC COTTON HARVESTER

George Dewey McKenzie, Evergreen, Ala.

Application September 16, 1953, Serial No. 380,541

2 Claims. (Cl. 56—13)

This invention relates to harvesting devices, and more specifically, to mechanical means for picking cotton from its bolls.

A primary object of this invention is to provide a device of the type described which may be admirably incorporated with an automotive vehicle assigned to operate between or straddle the cotton rows, and which affords means whereby a plurality of pickers may strip the cotton from the bolls simultaneously or independently of each other.

A further object of this invention is to provide a cotton harvester which will remove the cotton from the bolls with but a minimum of leaves and other debris.

Another object of this invention comprises the provision of electrically controlled suction means for picking cotton.

A still further object of this invention is to provide a mechanical cotton harvester having a high degree of efficiency and which is noncomplex in construction and operation, which requires but little maintenance, and which is relatively inexpensive to manufacture.

Other and further objects and advantages of the present invention will become apparent from a consideration of the following specification when read in the light of the accompanying drawings, in which:

Fig. 1 is a side elevation, with parts broken away and shown in section, illustrating a cotton harvester constructed in accordance with this invention and mounted on an automotive vehicle;

Fig. 2 is an enlarged vertical end elevation taken on the line 2—2 of Fig. 1, disclosing the arrangement of the valves and their respective operating mechanisms;

Fig. 3 is an enlarged elevational view with parts broken away and shown in section illustrating the component elements of one valve in its closed position and the electrical control therefor;

Fig. 4 is a cross section similar to Fig. 3, but showing the valve and its actuating mechanism when the valve is moved to its open position;

Fig. 5 is a cross section taken on the horizontal plane of line 5—5 of Fig. 3 and looking in the direction of the arrows; and, Fig. 6 is a detail cross section taken on the vertical plane of line 6—6 of Fig. 3 and looking in the direction of the arrows.

Referring now more specifically to the drawings, reference numeral 1 designates, in general, a conventional tractor or other vehicle designed to operate between or to span one or more rows of cotton. The tractor 1 is provided with the usual steering control 2 connected with the front wheels (not shown) and differential control lever 3. The rear wheels 4 are driven through axles 5 connected with a differential 6 in any manner well known in this art. A power take-off shaft (not shown) is connected at its inner end with the differential and has a drive pulley 7 at its other end rigidly secured thereon for rotation therewith.

The cotton harvester to which this invention is directed (see Fig. 1) comprises a hopper 8 fixedly mounted on the chassis of the vehicle 1 by brace members 9, 10. A suction fan casing 11 is suspended laterally from one side of the hopper 8 and communicates therewith through the discharge conduit 12. A plurality of impeller or fan blades 13 are keyed to shaft 14 within the casing 11, the shaft 14 being mounted for rotation in a boss 15 integrally formed with the casing 11 and having an external end portion on which a pulley 16 is keyed for rotation therewith. A slip drive relation is established between pulleys 7 and 16 by the pulley belt 17 which is connected therebetween.

The fan casing 11 is provided with a back cover plate 18 releasably secured thereon by stud screws 19. As is clearly seen in Fig. 1, the back cover plate 18 has an integrally formed rearwardly extending collar portion 20 in open communication with the interior of the fan casing 11 and which is adapted to receive thereon a conduit coupling 21.

Referring again to Fig. 1 of the drawings, a plurality of metallic pipes 22 of substantially the same construction are rigidly connected with and extend rearwardly from the coupling 21, the pipes 22 terminating at their other respective ends in open communication with the interior of one of a plurality of valve casings 23 (see Figs. 5 and 6) which are supported on the hopper 8 by pipes 22. One arrangement and disposition of the valve casings 23 on pipes 22 is shown in Fig. 2, however other arrangements could be employed is desired.

Turning now to Figs. 2 to 6, inclusive it is seen that each valve casing 23 is hollow and is substantially segmental in longitudinal cross section. The casing 23 is provided with a cover plate 24 of similar configuration, the latter being releasably secured to the former by bolts 25 and nuts 26.

The cover plate 24 is provided with an outwardly extending hollow boss 27 forming an inlet port aligned with the discharge port 28 which receives the terminal end of pipe 22. One end of a flexible elongated hose 29 is releasably secured over the boss 27 by an annular clamp 30. The other end of the hose 29 is connected with a suction nozzle 31 (see Fig. 1).

Within the casing 23 and cover plate 24 is disposed a valve, indicated in general by the reference numeral 32. The valve 32 is segmental in configuration and has the smaller end thereof keyed at 33 to a cross-shaft 34 for rotation therewith. The cross-shaft 34 is mounted for rotation in oppositely disposed bosses 35, 36 and is provided with an enlarged head 37 at one end while the other end thereof is keyed or otherwise rigidly secured within a hub 38 of a rock bar 39.

The larger end of valve 32 has a pair of substantially circular packing members 40 mounted on opposite sides thereof whereby when the valve 32 is pivoted to its closed position as shown in Fig. 3, the members 40 extend across and seal the adjacent ends of the pipe 22 and boss 27. When the valve 32 is moved to its open position as shown in Fig. 4, the free end of the valve together with its packing members are moved downwardly out of the path of the pipe 22 and boss 27.

The valve 32 is alternately actuated from its closed to its open positions through forces generated by a helicoidal tension spring 40 and by the solenoid 41. From Figs. 3, 4 and 5 it is seen that one end of the spring 40 is secured to one end 42 of the rock bar 39, while the other end 43 of the bar 39 is pivotally connected at 44 to link member 45 internally threaded to connect with conventional take-up means 46, 47. The latter means is threadedly connected to one end of the armature 48 mounted within solenoid 41. Each solenoid 41 is rigidly secured to the hopper 8 by supports 49, while the springs 40 each have their other ends secured to anchoring lugs 50 which project laterally from the hopper 8.

The solenoids 41 are independently energized through electric circuits which utilize a common source of E. M. F., namely the battery 51 of the vehicle 1. The circuits are clearly shown in Fig. 1 and include the conductor 52 having one of its ends connected with one side of the battery 51 which is tied into one side of the solenoids 41 through leads 53. The other side of each solenoid connects through lead wires 54 with extension wires 55 which terminates in the fixed contact of a switch 56 mounted on the nozzle 31. Switch blade 57 is connected through extension wire 58, conductor 59, and then back to the other side of the battery 51. As is seen in Fig. 1, the extension wires 55 and 58 extend longitudinally of the hose 29 and are secured thereto.

The spring 40 normally biases the valve 32 toward its closed position as shown in Fig. 3. To actuate the valve for movement to its open position as illustrated in Fig. 4, switch 57 is closed to energize one of the solenoids through the circuits described above. Such energization forces armature 48 to move laterally to the right (Fig. 4) turning rock bar 39 counterclockwise to rotate shaft 34. This causes the valve 32 to pivot downwardly to its open position. Upon opening of the switch 56 the circuit controlled thereby is broken and the solenoid 41 becomes de-energized. As this occurs, the force exerted by spring 40 on rock bar 39 causes valve 32 to pivot back to its normally closed position.

Having described this invention in detail its operation is deemed obvious. The vehicle 1 is first placed in operation to effect rotation of the pulley 7. The latter drives pulley 16 through pulley 17 to rotate fan blades 13 to produce a suction or vacuum in pipes 22 and high pressure in conduit 12. A plurality of cotton pickers are each provided with a nozzle 31 which is held adjacent the cotton to be harvested. At this point the picker will actuate switch 57 to energize one of the solenoids 41 whereby valve 32 is moved from its closed to open position. This connects the suction side of the fan with the hose 29 and nozzle 31 causing the cotton to be extracted from its boll. The cotton is sucked through nozzle 31, hose 29, valve casing 23, pipes 22, coupling 21 and into the fan casing 11. Fan blades 13 impel the cotton upwardly into the pressure side of the casing from whence the cotton is discharged through conduit 12 into hopper 8.

It will be understood that the embodiment of the invention described and illustrated herein is offered by way of example and that the invention is only to be limited by the scope of the following claims.

I claim:

1. In a cotton harvester, a vehicle having a power take-off shaft extending therefrom, a hopper on said vehicle, a suction fan casing suspended laterally from one side of said hopper and communicating therewith, a plurality of fan blades positioned in said casing, belt and pulley means connecting said blades to said power take-off shaft, a cover plate releasably connected to said casing, a collar extending from said plate, a coupling on said collar having a plurality of pipes extending rearwardly therefrom, valve casings supported on said hopper and connected to said pipes, each of said valve casings being hollow and having a cover plate releasably connected thereto, an outwardly extending hollow boss projecting from said last named cover plate forming an inlet port, a flexible elongated hose having one end releasably connected to said boss and its other end connected with a suction nozzle, a segmental valve positioned in said valve casing and having its smaller end keyed to a cross shaft, a rock bar connected to said cross shaft, a tension spring and solenoid for actuating said valve.

2. In a cotton harvester, a plurality of casings each having a valve positioned therein and said valves being keyed to a cross shaft, bosses for rotatably supporting said cross shaft, a rock bar keyed to said cross shaft, the larger end of said valve having a pair of packing members mounted on opposite sides thereof, a spring and solenoid for actuating said valve, an end of said spring being secured to an end of said rock bar, and a source of E. M. F. and a switch connected to said solenoid.

References Cited in the file of this patent

UNITED STATES PATENTS

| | | |
|---|---|---|
| 608,689 | Lee | Aug. 9, 1898 |
| 767,058 | Harvin | Aug. 9, 1904 |
| 773,357 | Webb | Oct. 25, 1904 |
| 830,443 | Le Vin | Sept. 4, 1906 |
| 887,178 | Babbitt | May 12, 1908 |
| 891,191 | Shinn et al. | June 16, 1908 |
| 1,370,260 | Anderson | Mar. 1, 1921 |
| 1,448,930 | McElroy | Mar. 20, 1923 |
| 1,455,908 | Daniel | May 22, 1923 |
| 1,805,367 | King | May 12, 1931 |
| 1,971,349 | Koon | Aug. 28, 1934 |